(12) United States Patent
Gupta et al.

(10) Patent No.: US 7,289,456 B2
(45) Date of Patent: Oct. 30, 2007

(54) DETERMINING AND PROVISIONING PATHS WITHIN A NETWORK OF COMMUNICATION ELEMENTS

(75) Inventors: Sanyogita Gupta, Edison, NJ (US); Richard Ferrer, Hillsborough, NJ (US); Raj C. Raheja, Piscataway, NJ (US)

(73) Assignee: Telcordia Technologies, Inc., Piscataway, NJ (US)

(*) Notice: Subject to any disclaimer, the term of this patent is extended or adjusted under 35 U.S.C. 154(b) by 896 days.

(21) Appl. No.: 10/118,187

(22) Filed: Apr. 8, 2002

(65) Prior Publication Data

US 2003/0189919 A1    Oct. 9, 2003

(51) Int. Cl.
*H04L 12/28* (2006.01)
(52) U.S. Cl. .................. 370/254; 370/389; 370/401
(58) Field of Classification Search ........... 370/401, 370/351, 352, 357, 345.1, 403, 404, 405, 370/252, 254, 241, 389, 386, 392
See application file for complete search history.

(56) References Cited

U.S. PATENT DOCUMENTS

| | | | |
|---|---|---|---|
| 2002/0018264 A1* | 2/2002 | Kodialam et al. | 359/128 |
| 2003/0021227 A1* | 1/2003 | Lee et al. | 370/228 |
| 2003/0135304 A1* | 7/2003 | Sroub et al. | 701/1 |
| 2005/0089027 A1* | 4/2005 | Colton | 370/380 |
| 2005/0197993 A1* | 9/2005 | Korotky | 706/52 |

* cited by examiner

*Primary Examiner*—Ajit Patel
(74) *Attorney, Agent, or Firm*—Joseph Giordano; Philip J. Feig

(57) ABSTRACT

A graph of a network is created by efficiently modeling the network elements, and the network links and virtual trunks that interconnect these elements. The network elements are model as one or more routing nodes wherein each routing node represents part of an element or a set of one or more elements, and has the characteristic that any ingress and egress ports of the network element or network elements associated with the routing node can be interconnected. The network links and virtual trunks are both modeled as routing links, wherein routing links interconnect the routing nodes to create the graph of the network. The graph is subsequently used for determining routing paths through the network for the provisioning of virtual trunks and circuits.

28 Claims, 7 Drawing Sheets

DETERMINING AND PROVISIONING PATHS WITHIN A NETWORK OF COMMUNICATION ELEMENTS

BACKGROUND OF OUR INVENTION

1. Field of the Invention

Our invention relates generally to the end-to-end configuration of communications networks. More particularly, our invention relates to methods and apparatus for determining a routing path between two end-points in a communications network and for configuring this routing path.

2. Description of the Background

Communications networks, such as next generation broadband networks, are becoming increasingly complex with respect to size, the numerous intermixed technologies/protocols (e.g., ATM, Frame Relay, etc.), and the numerous vendors supplying equipment. Coincident with this complexity is the emergence of network configuration management systems that can provision virtual trunks and circuits within these networks, which provisioning requires both the determination of paths/routes between endpoints in these networks and the subsequent communicating with the network elements to actually realize the trunk or circuit.

FIG. 1 shows an exemplary network configuration management system 102 and a managed network 110. The network configuration management system performs several functions and in particular, is responsible for determining a preferred route path between two designated network endpoints and for provisioning a communications connection across this route by communicating with the managed network 110. Managed network 110 comprises broadband network 112, which consists of a plurality of network elements 114-118 interconnected by physical links and virtual private connections/trunks (VPCs) 120-124 (note that "network element" refers to a functional entity and as such, a given network element may actually comprise one or more physical elements). The network elements comprise varying technologies and protocols and are from differing vendors. Managed network 110 further comprises network management systems (NMSs) 126 and element management systems (EMSs) 128. These systems are typically provided by the network element manufacturers and are capable of performing the actual configuration and management of the individual network elements. Specifically, depending on the technology and vendor, some network elements are configured through the use of a NMS 126. These systems collectively manage a set of network elements 114 and the physical links 120 between them. Given two edge ports 130 and 132, the NMS can determine a set of links and network element cross-connects to interconnect the edge ports and can subsequently provision the network elements to realize this interconnection. (Note that some EMSs can also collectively manage a set of network elements. Hereinafter, "NMS" will be used to refer to both NMSs and EMSs that collectively manage a set of network elements.) Other EMSs, such as EMS 128, manage one or more network elements 118, but not the links 126 between them. Here, a higher layer entity determines the links and network elements required to create a path and then instructs the EMS to perform the necessary cross-connects to realize the complete path. Still other network elements 116 use neither an NMS nor EMS. A higher layer entity directly communicates with these elements to perform a network configuration. As shown in FIG. 1, network configuration management systems currently determine end-to-end network paths (such as between ports 130 and 134) for the provisioning of virtual circuits and virtual trunks, and then communicate with the NMSs, EMSs, and network elements to provision these virtual circuits and virtual trunks across these determined paths.

Of particular concern here is how the network configuration management systems determine end-to-end network paths. In general, network configuration management systems model the network components and the interconnectivity of these components to create a graph, which graph is then used to determine routing paths across the network. Once having a routing path, the network configuration management systems then communicate with the NMSs, EMSs, and network elements to provision the path. The issue is how these models and graphs are created.

Again, a broadband network comprises both physical network elements, each having a plurality of physical ingress and egress ports, and numerous physical links that interconnect adjacent ports. Network configuration management systems use the network elements and physical links to provision virtual trunks. As such, these systems model the network elements and physical links in order to determine and provision routing paths for the virtual trunks. In addition however, once virtual trunks are provisioned, they can be used to provision virtual circuits. As such, the network configuration management systems also model established virtual trunks. Conceptually, these elements comprise different layers with respect to routing. The problem with prior network configuration management systems is that the modeling of the network elements, physical links, and virtual trunks maintains this layered view resulting in inefficient models that do not adapt well to diverse network elements and large networks, leading to large and complex graphs that create performance and scalability issues.

Specifically, prior systems model a network by representing every port of every network element as a node of a graph and by maintaining a representation of the physical links that interconnect these ports as links that interconnect the nodes of the graph. In addition, these systems separately maintain a services view of the network, which view is used to maintain representations of the established virtual trunks within the network. These techniques result in a network model and network graph that are large and difficult to manage as the network grows, thereby creating the scalability issues. In addition, because ports are modeled as nodes, network paths are determined by traversing each physical hop in the network leading to the performance issues.

SUMMARY OF OUR INVENTION

It is desirable to have methods and apparatus that overcome the disadvantages of prior systems and provide for the determining and provisioning of paths within networks by modeling the networks to allow for efficient and scalable routing. Specifically, in accordance with our invention, each network element in a network is classified according to one of several routing models, where a routing model indicates how the ports of a network element can be interconnected among themselves and to other network elements. Based on these classifications, each network element is represented as one or more routing nodes, or is associated with a group of network elements and the group collectively represented as a single routing node. A routing node is an entity where any edge ports of the network element or network elements associated with the routing node can be interconnected. A port can be an ingress port and an egress port, the distinction depending on the direction of communication at any one time. Accordingly, ports are referred to as ingress and egress only as a way to illustrate how connections can be made across network elements. In accordance with another aspect of our invention, the network links are modeled as routing links that interconnect the routing nodes. Similarly, provisioned virtual trunks are also modeled as routing links. Together, the routing links and routing nodes create a graphical representation of the network, which graphical representation is used to determine routing paths between points in the network for new virtual trunks and virtual circuits. The routing links and nodes comprising the determined paths are then used to determine a set of cross-connections required to provision the new virtual trunks and virtual circuits within the networks.

In accordance with another aspect of our invention, in addition to determining a routing path between two points for a virtual trunk or circuit, alternate routing paths between the two points are also determined. In addition, if multiple routing links are available between two routing nodes along a path, these multiple links are also noted. Together, these alternate paths and multiple links can be used for load balancing considerations and, in the event a preferred path for a virtual trunk or circuit cannot be established, for provisioning the virtual trunk or circuit over a different path.

In accordance with a further aspect of our invention, the status of each cross-connection comprising a provisioned virtual trunk/circuit is maintained, which status indicates whether a cross-connection has been successfully provisioned. In the event a virtual circuit/trunk is not successfully provisioned because of one or more failed cross-connections, the circuit/trunk can be re-provisioned by noting the failed cross-connections.

DETAILED DESCRIPTION OF OUR INVENTION

Figure 1:
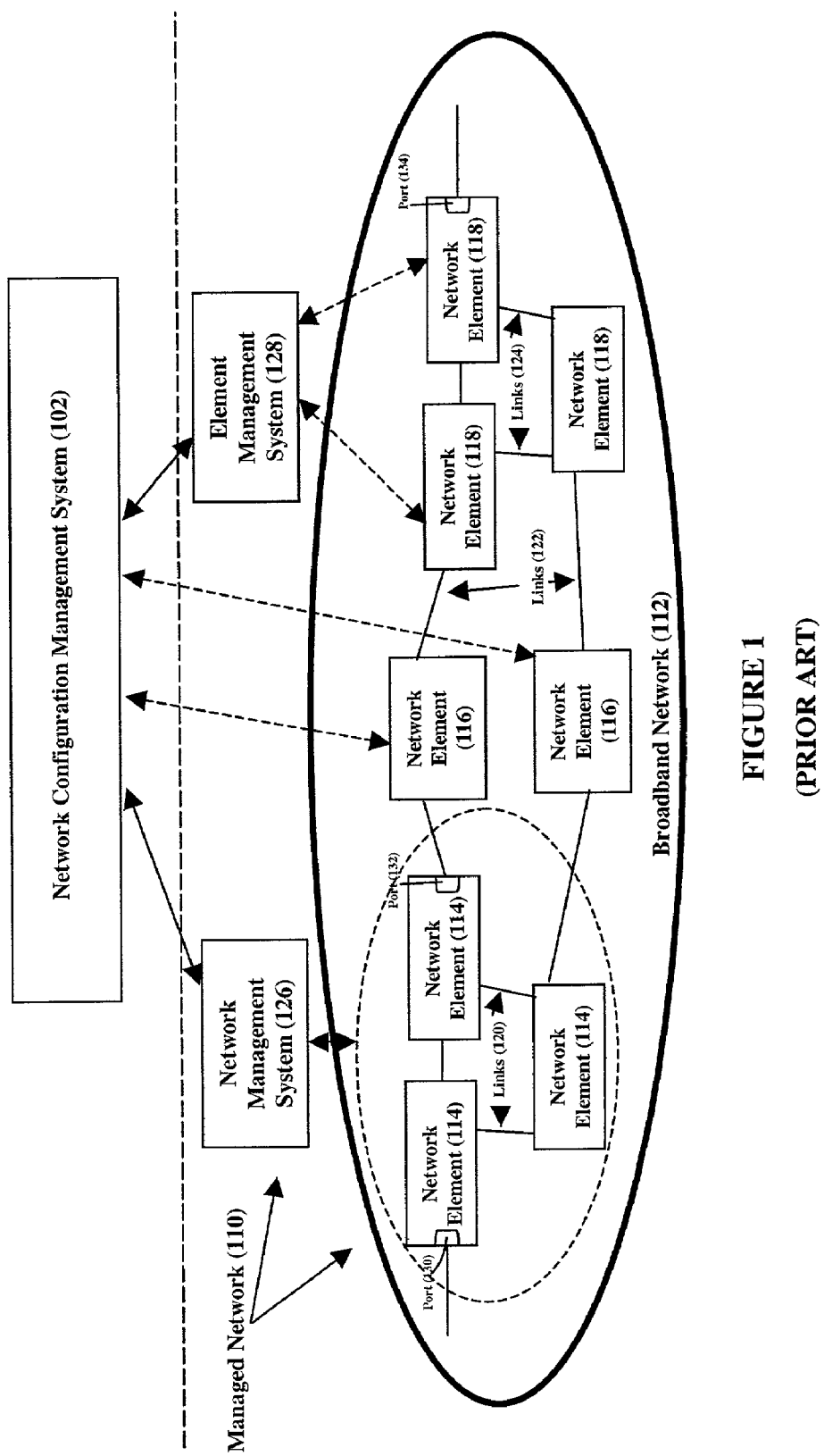
FIG. 1 depicts a prior art managed broadband network and a network configuration management system for determining and provisioning route paths within this managed network.
Figure 2:
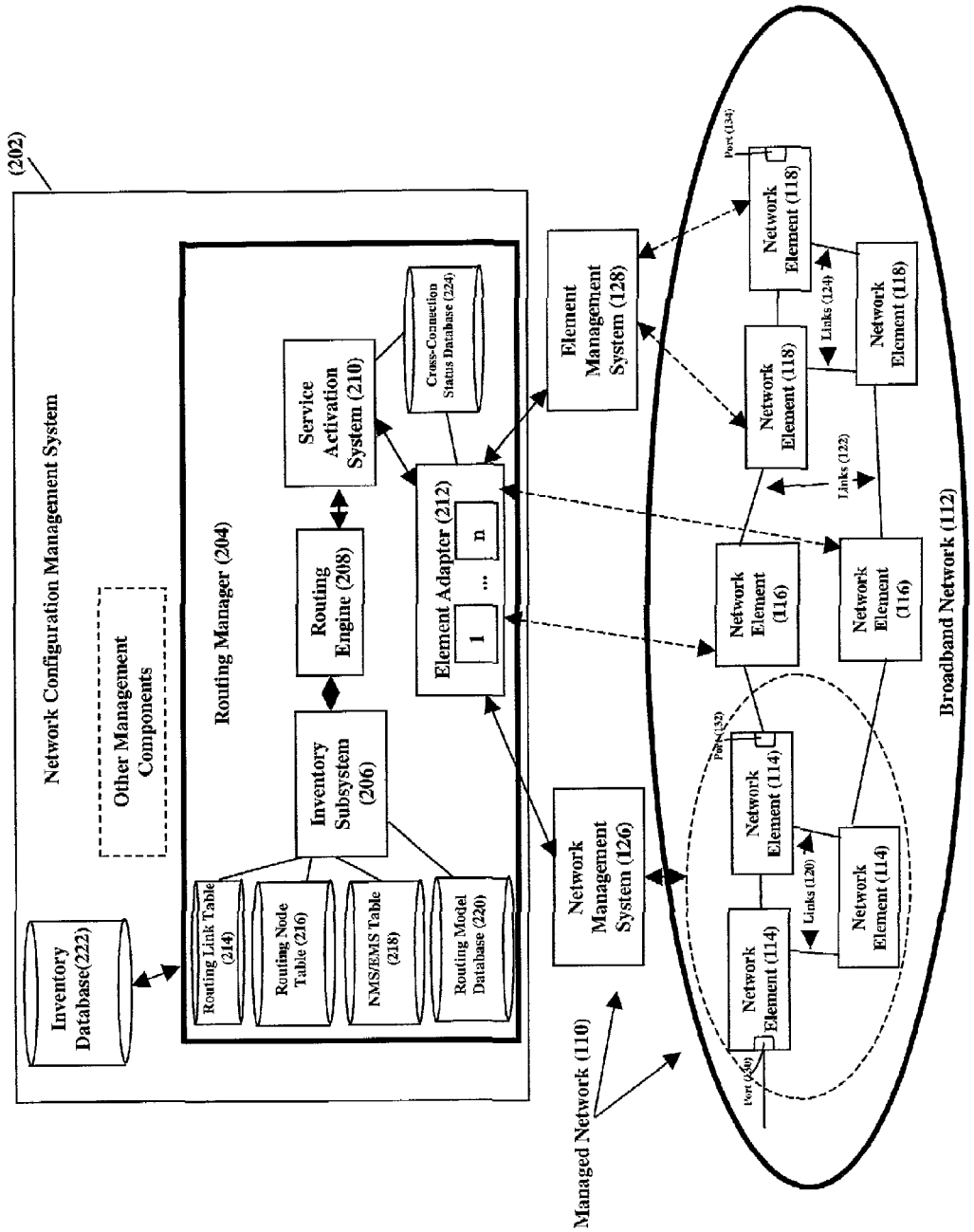
FIG. 2 depicts an illustrative embodiment of a network configuration management system of our invention for modeling managed broadband networks as routing nodes and routing links and for using this model to determine and provision route paths within the network.

Our invention comprises methods and systems for determining preferred routing paths between two end-points within broadband networks by modeling the networks, and for using these determined paths to provision virtual circuits and trunks within the networks. As such, as shown by FIG. 2, our invention is part of a larger network configuration management system 202, and in particular, is directed at a routing manager 204, which is a sub-component of the network configuration management system 202 and which provides end-to-end connection management functions including the determination and provisioning of routing paths in broadband network 110.

The routing manager 204 comprises an inventory subsystem 206, a routing engine 208, a service activation system 210, and an element adapter 212. Broadly, the routing manager 204 maintains a topological graph comprising "nodes" and "links" that model the broadband network 110. This graph is used to determine and provision routing paths given two endpoints within the network, which routing paths are used to provision virtual circuits and trunks. The inventory subsystem 206 builds and maintains the topological graph in accordance with the modeling methods of our invention. This graph is maintained, illustratively, in three database tables: routing link table 214, routing node table 216, and NMS/EMS table 218. Given two endpoints (either virtual or physical) in the broadband network, the routing engine 208 determines a routing path through the network using the network graph maintained by the inventory subsystem 206. The service activation system 210 then uses the determined routing path to provision the actual virtual circuit or virtual trunk. Specifically, the service activation system activates the routing engine 208 to obtain a routing path given two endpoints and then invokes the element adapter 212 to physically provision the determined path. The element adapter 212 interfaces the routing manager 204 to the managed broadband network 110, specifically, to the NMSs 126, EMSs 128, and network elements 116. There is a specific adapter 212 (1 . . . n) for each vendor's NMS, EMS, and network element in the network, each adapter understanding how to communicate with its corresponding management system. Once the service activation system determines a routing path, it invokes the appropriate adapter modules to communicate the required configuration settings to the management systems 126, 128, and 116 to provision the determined path.

The following sections first describe our inventive methods for modeling a managed network 110, then describe how a topological graph of this network is created using the modeling methods, and finally describe how this topological graph is used to determine and provision a routing path within the managed network. Our inventive modeling method involves both the modeling of network elements and the modeling of the physical links and virtual trunks between these elements.

Beginning with the network elements, our inventive modeling method is based on the concept of viewing the network elements from the standpoint of their intra-connectivity characteristics, in other words, the level at which a higher-order system, here the routing manager 204, must specify in order to connect an ingress port on a network element to an egress port (as further described below and contrary to the prior systems, our invention is only concerned with ports that have an associated link). For example, if a cross-connect decision can be made by an NMS 126 or an EMS 128, then the models maintained by the routing manager 204 need only reflect the NMS/EMS capabilities. Broadly, the objective of our invention is to model the network elements such that any ingress port entering a model can be connected to any egress port that exits the model, which inventive method of modeling therefore reflects the actual level of control required by the routing manager 204. For example and as further described below, the routing manager can configure a set of network elements 114 managed by the NMS 126 by specifying edge ports (such as 130 and 132) to the NMS 126, which then determines and provisions a set of network elements and links that can interconnect the two ports. Hence, the routing manager need not be concerned with the network elements 114 and the links 120 that interconnect them and as such, the routing manager can view these combined elements as a single entity. As described earlier, the prior systems would view network elements 114 not as a single entity but rather, as a set of numerous entities, each representing an ingress or egress port on one of the network elements 114.

Specifically, in accordance with our invention, all network elements comprising the broadband network are classified according to one of several routing models, wherein a routing model describes and is based on how connections are physically setup across the element(s). Note however, that different types of equipment can be categorized as the same type of model. Once classified, the network elements are represented as one or more routing nodes where a routing node represents an entity in which all communications that enter the entity on a given ingress port can be connected to any of the egress ports that exit the entity (ingress and egress ports, as used here, can be either physical or virtual ports).

Turning to the specific modeling methods for network elements, four types of routing models are defined below—the Cloud Model, the Network Element Model, the Chassis Restricted Model, and the Daisy-Chain Model; however, as different types of network elements are developed and incorporated into communications networks, nothing precludes other types of models from being defined. Regardless of the equipment type, the distinction and uniqueness of our inventive modeling method is to model the equipment type as a routing node such that any ingress port that enters the routing node can be interconnected to any egress port that exists that routing node.

Figure 3:
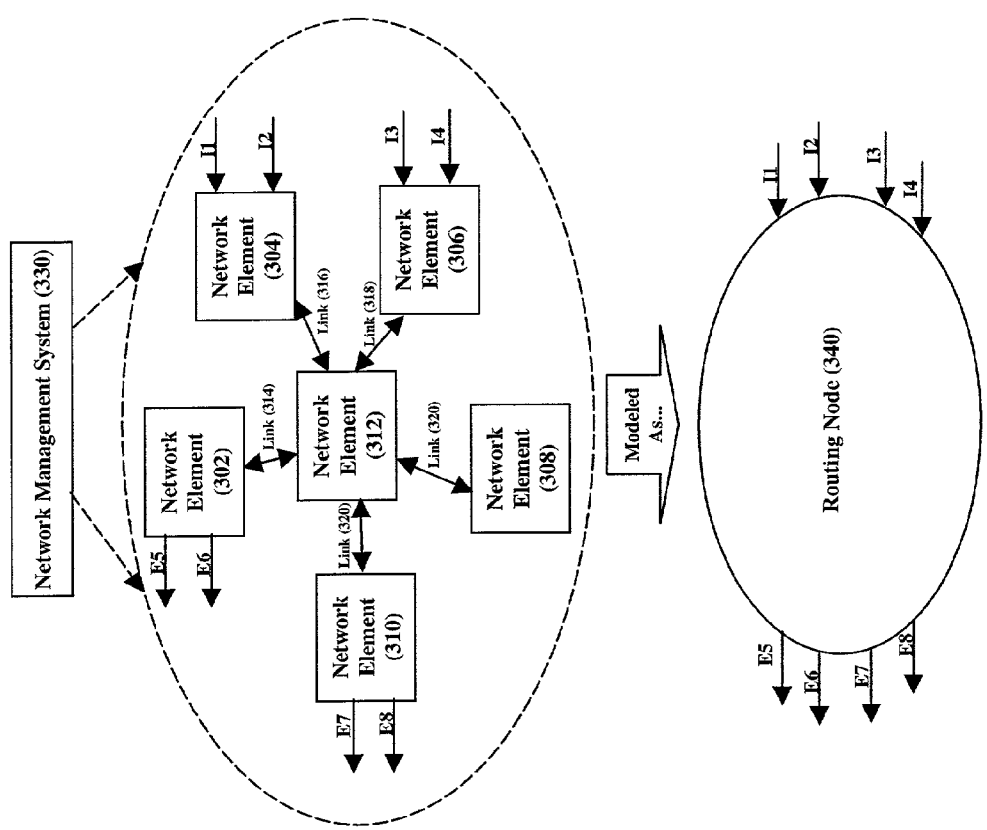
FIG. 3 depicts a first illustrative example of our invention wherein network elements that are collectively managed by a single network management system such that any ingress port on any edge network element can be connected to any egress edge port on any edge element are modeled as a single routing node.

Beginning with the cloud model, as specified above, NMSs are capable of managing a set of network elements and creating connections between these elements when provided with configuration parameters, source/destination ports, etc. As a result, the routing manager 206 need not be concerned with how these network elements are managed, how these elements are physically interconnected, or with interconnecting these devices to establish a path. From the standpoint of the routing manager, any two ingress/egress edge ports on a set of NMS managed network elements can be interconnected. Hence, in accordance with our invention, network elements managed by a common NMS are classified under the cloud routing model and result in a single routing node, where only the edge ports of the edge devices are of concern (these being the points of interconnection to other routing nodes). Hence, contrary to the prior systems, numerous network elements, numerous ports, and numerous links are all condensed into a single node. FIG. 3 shows an example of the cloud model. Network elements 302-312 are interconnected by internal links 314-320 and interface to other network elements through ingress edge ports I1-I4 and through egress edge ports E5-E8. Network management system 330 collectively manages the network elements 302-312 and links 314-320, interconnecting any ingress edge port I1-I4 to any egress edge port E5-E8. As such, the network elements and internal links can be modeled as a single routing node 340, the connectivity characteristics of the routing node being such that any ingress edge port I1-I4 can be connected to any egress edge port E5-E8. Lucent's CBX 500 ATM switch is an example of a network element that can be modeled using the cloud routing model.

Figure 4:
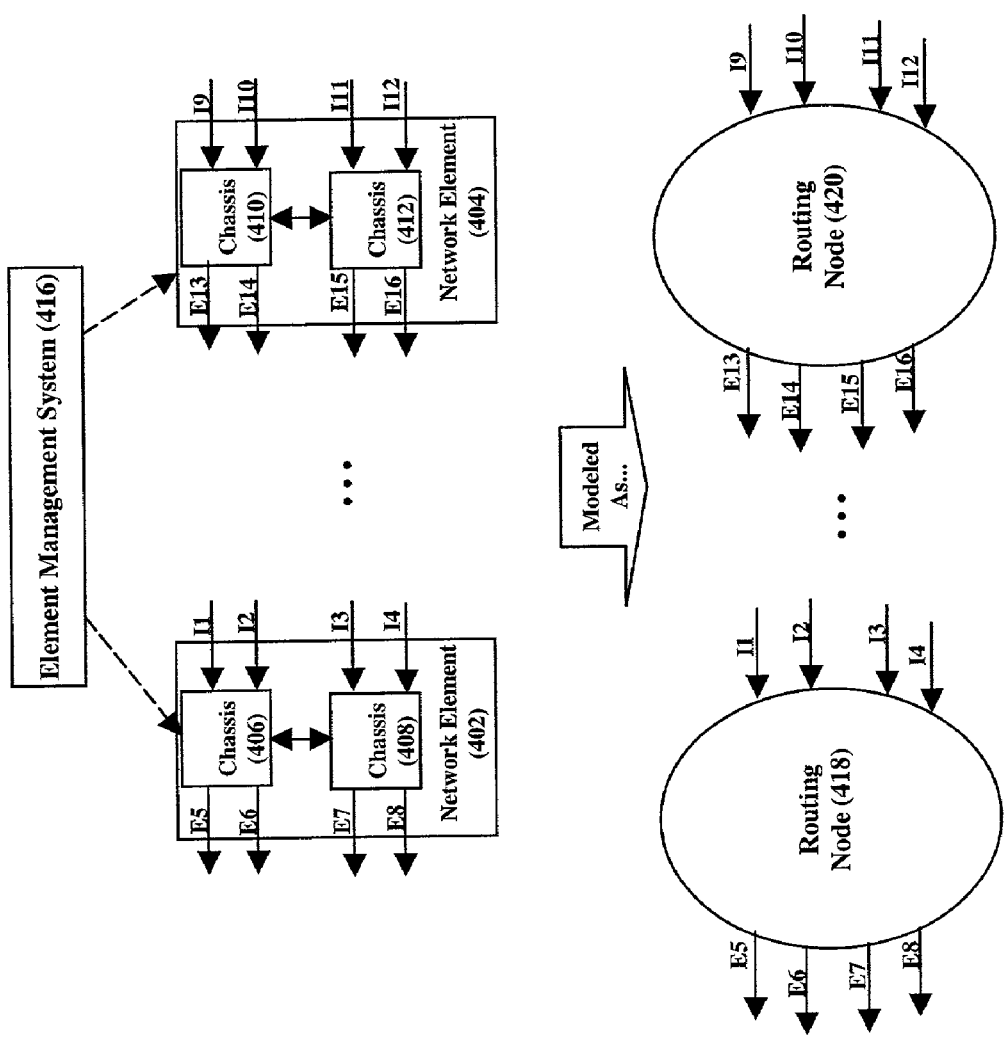
FIG. 4 depicts a second illustrative example of our invention wherein network elements that allow any ingress port to be cross-connected to any egress port are modeled as a single routing node.

The network element model represents network elements where any ingress edge port on the network element can be connected to any egress edge port. The network element may comprise multiple chassis, and the ingress and egress ports can be on any chassis. These systems are controlled by an EMS or directly by the network element itself. Contrary to network elements modeled under the cloud model, the routing manager 204 needs to determine which links to use between network elements when determining a routing path; however, the routing manager need not be concerned if an ingress port corresponding to a chosen input link can be cross connected to an egress port corresponding to a chosen output link. Hence, these elements can be represented as a single routing node. FIG. 4 shows an example of the network element model. For exemplary purposes, network elements 402 and 404 each comprise multiple interconnected chassis 406-412 and interface to other network elements through ingress edge ports I1-I4 and I9-I12 and through egress edge ports E5-E8 and E13-E16. Element management system 416 individually manages each network element 402-404 (for example), interconnecting any ingress edge port on a network element to any egress edge port on the same element. As such, each network element can be modeled as a single routing node 418-420, capable of interconnecting any ingress edge port I1-I4 and I9-I12 to any egress edge port E5-E8 and E13-E16. Alcatel's 1000ADS is an example of a network element that can be modeled using the network element model.

Figure 5:
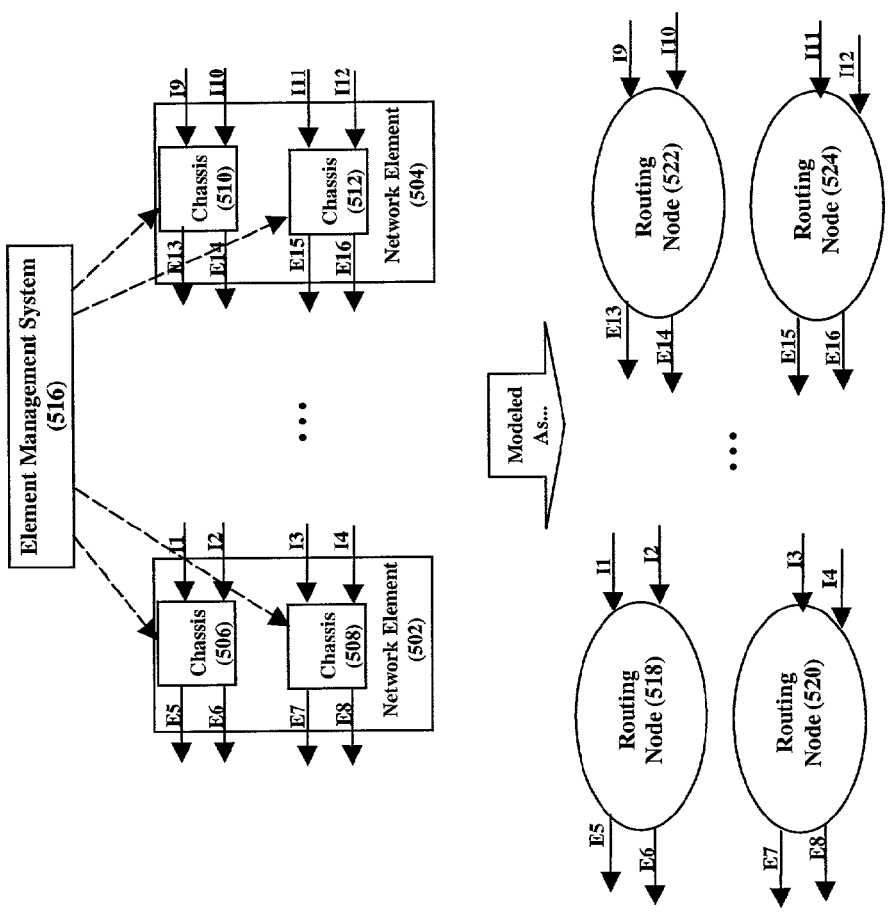
FIG. 5 depicts a third illustrative example of our invention wherein network elements comprising one or more chassis, each chassis having ingress and egress ports that can only be cross-connected amongst each other, are modeled such that each chassis is represented as a single routing node.

The chassis restricted model represents network elements comprising one or more chassis wherein each chassis is restrained by the following restriction: an ingress port on a network element chassis can only be connected to an egress port on the same chassis (i.e., input-output port interconnections are restricted to a chassis). All chassis within the network element are controlled by the same EMS or directly by the network element itself. Because of the restriction, the routing manager 204 requires a greater degree of concern when determining a path; specifically, the routing manager must ensure that an egress port corresponding to a chosen outgoing link is connected to the same chassis as the ingress port corresponding to a chosen input link. Hence, these network elements are modeled at the chassis level, with each chassis modeled as a single routing node. FIG. 5 shows an example of the chassis restricted model. Network elements 502 and 504 each comprise multiple chassis 506-512, where ingress edge ports I1-I2 and I3-I4 can only be interconnected to egress edge ports E5-E6 and E7-E8, respectively (similar for the ingress/egress ports of network element 504). Element management system 516 individually manages each chassis of the network elements (for example). As such, each chassis of each network element can be modeled as a single routing node 518-524, each routing node depicting the ingress port and egress port restriction described above.

Figure 6:
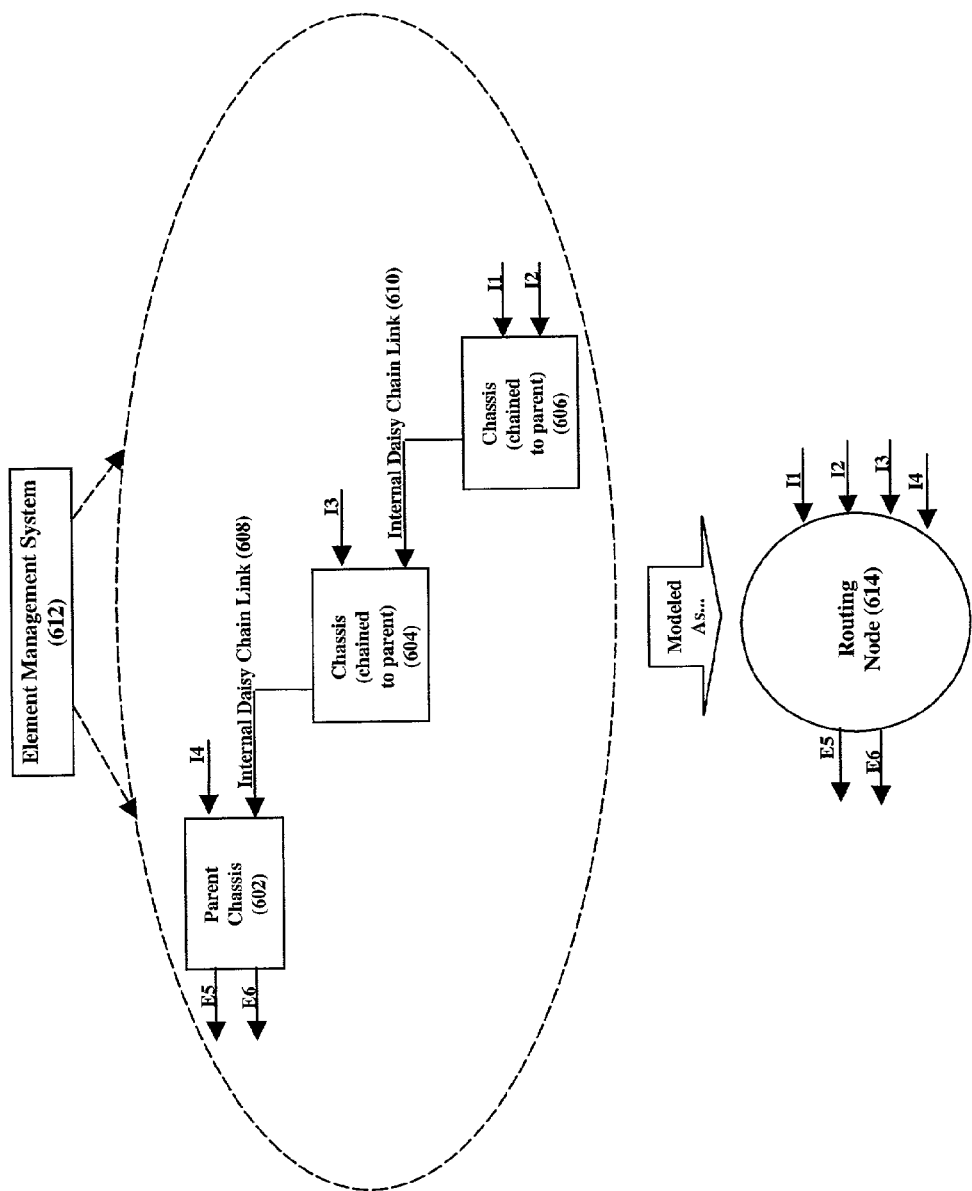
FIG. 6 depicts a fourth illustrative example of our invention wherein network elements that are chained together such that any ingress port on any element can only be connected to an egress port on the parent of the chain are modeled as a single routing node.

The daisy-chain restricted model represents network elements comprising a set of chassis (either within a single network element or across several network elements) daisy-chained together and restrained by the following restriction: any ingress port on any chassis must be connected to an egress port on the parent of the chain. All chassis within the network element are controlled by the same EMS (or directly by the parent chassis itself), which system is capable of connecting any ingress port on the child and parent chassis to any egress port on the parent chassis. As a result, the routing manager need not be concerned with how the chassis are physically interconnected or with interconnecting these chassis to establish a path. From the standpoint of the routing manager 204, any ingress port can be connected to any parent chassis egress port. Hence, in accordance with our invention, daisy-chained network elements are classified under the daisy-chain model and result in a single routing node, where only the ingress ports that enter the child/parent chassis and the egress ports that exit the parent chassis are of concern. In essence, the routing node represents the parent chassis in this case. FIG. 6 shows an example of the daisy-chain restricted model. Network elements 602-606 are daisy-chained through daisy-chain links 608 and 610, allowing any ingress port I1-I4 to be connected to any egress port E5-E6. Element management system 612 (for example) collectively manages the chassis 602-606 to achieve this connectivity. As such, the chassis can be collectively modeled as a single routing node 614. DSC's Litespan DSLAM is an example of a network element that can be modeled using the daisy-chain restricted model.

Turning to the modeling of network connections, as discussed above network configuration management systems use both physical links and provisioned virtual trunks to provision new services. As such, both physical links and provisioned virtual trunks should be modeled. Our inventive modeling methods comprise two inventive concepts. First, only the physical links between routing nodes are modeled; links interconnecting the network elements of a cloud model are not modeled. Second, our modeling methods treat provisioned virtual trunks as physical links and as a result, both physical links and provisioned virtual trunks are modeled the same, both as "routing links". As such, in accordance with our invention, routing links interconnect the routing nodes, and the routing links and routing nodes together comprise a graph representing the network topology, which graph is used to determine and provision new routing paths.

It is important to note that, contrary to the prior art, our invention does not explicitly model network element ports. Ports are indirectly represented when a routing link is designated as connecting two routing nodes because routing links interface routing nodes at edge ports (these ports being both physical and virtual); but, no explicit model exists for the ports. This is more clearly seen by the fact that ports that have no physical connections to adjacent network elements are never represented in our models. The result of our inventive modeling method for network elements and links is a simplified representation of a physical network from which routes can be determined and provisioned.

Specifically, as compared to the prior systems, our invention simplifies the representation of the network in at least two ways. First, the prior systems model a network based on the network element ports and as such, expand the physical representation of the network and cause a network configuration management system to manage how the network element ports are interconnected. Because our invention views network elements from the standpoint of their intra-connectivity characteristics, the resulting network model is simplified as compared to the actual network and the routing manager 204 of our invention need not be concerned with how network elements achieve internal connectivity. Second, the prior systems model all physical links and treats physical links differently from virtual trunks, whereas our invention views all connectivity forms the same. Overall, once a routing path comprising a set of routing nodes and routing links is determined, the path is provisioned by cross-connecting the routing node edge ports corresponding to the routing links.

Having described our inventive methods for modeling the network elements and links, a description of the systems and methods as to how these models are used to create a topological graph that represents the physical network will now be provided. As indicated, the inventory subsystem 206 is responsible for building/maintaining the routing topology of the network 110. In general, the routing topology is created/modified each time a physical network element is added to, removed from, or modified within the network, each time a physical link between two network elements is added or removed, and each time a virtual trunk is provisioned or de-provisioned. The physical transformation of the network is generally tracked by the network configuration management system 202 and is reflected in an inventory database 222, which stores all network specific information describing the network elements within the network. Each time the network changes, the network configuration management system updates the inventory database and invokes the inventory subsystem 206 to update the routing topology/graph.

The inventory subsystem 206 maintains the routing topology using three tables, the routing link table 214, the routing node table 216, and the NMS/EMS table 218, although more or less than three tables can be used without departing from the inventive concepts of our invention. In addition, the inventory subsystem builds these tables by referencing the inventory database 222 and a routing model database 220, which routing model database maintains a list of vendor specific network elements and the type of routing model (i.e., cloud, network element, etc.) each element is classified as.

Figure 7:
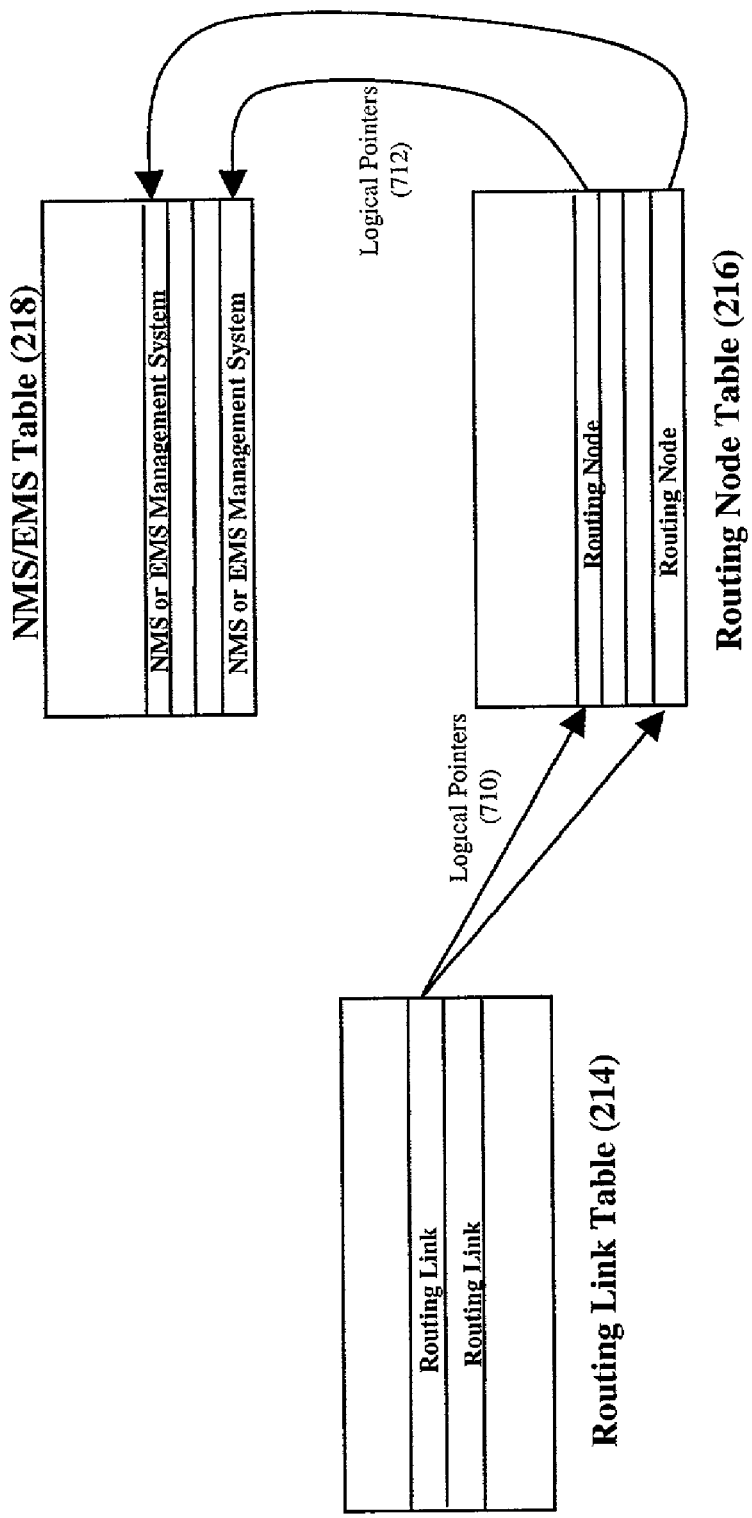
FIG. 7 depicts an illustrative database in accordance with our invention for implementing the model of the managed broadband network.

FIG. 7 shows the logical relationship between the routing link table 214, the routing node table 216, and the NMS/EMS table 218. The routing node table maintains one entry for each routing node in the model/graph. Each routing node entry indicates, for example, the type of routing node (i.e., cloud model, network element model, etc.), a unique routing node identifier, network element specific information such as the network element identifier, and an indication of the management system that is used to control the network element(s) comprising the routing node (e.g., by indicating a NMS/EMS table entry that corresponds to the management system, the indication being represented by logical pointer 712 in FIG. 7). The routing link table maintains an entry for each routing link that interconnects two routing nodes, where a link represents a physical link or a virtual trunk across multiple network elements. Each routing link entry indicates, for example, the two routing nodes the link interconnects (e.g., by indicating each routing node's unique routing node identifier, this indication being represented by logical pointer 710 in FIG. 7) and link specific information such as link capacity. The NMS/EMS table indicates the specific management systems the routing manager 204 must communicate with in order to actually configure the network elements represented by the routing nodes, again the management systems being a NMS, an EMS, or the network elements themselves. As such, each routing node as just described has a corresponding NMS/EMS entry and maintains a link 712 to the entry. Each NMS/EMS table entry contains, for example, a table identifier used to represent the specific management system instance within the model, and the management system's subnetwork identifier within the network (Note that for a network element controlled by the network element itself, the subnetwork identifier is the network element identifier). In general, multiple routing link entries can point to the same two routing nodes if the routing nodes are interconnected by more than one link. In addition, multiple routing node entries can point to the same NMS/EMS entry if the routing nodes are managed by the same management system (e.g., a network element containing multiple chassis modeled using the chassis restricted model is represented as multiple routing node entries with each entry indicating the same NMS/EMS table entry).

Reference will now be made to the actual creation of the routing topology/graph within these tables, beginning with the network elements and the routing node and NMS/EMS tables. As indicated, each time a network element is added to the network, the network configuration management system 202 updates the inventory database 222 to reflect the new element. The network configuration management system then calls the inventory subsystem 206 to update the routing topology. In general, for each network element added to the network, the network configuration management system provides the inventory subsystem with, for example: the product type, the manufacturer, and the network element identifier. Having this information, the inventory subsystem uses the manufacturer and product information to query the routing model database 220 to determine the equipment's routing model type and uses the network element identifier to query the inventory database 222 to determine the subsystem identifier of the management entity that controls the network element. Based on this information, the inventory subsystem updates the routing tables, as described below. Note that the updating of the topology is somewhat dependent on the routing model type. Again, as new routing models are developed, similar methodologies can be used.

Beginning with network elements collectively managed by a single NMS and classified as the cloud model, these elements are collectively represented as a single routing node. As such, these network elements are represented by a single routing node table entry and by a single NMS/EMS table entry (note that each collective group of network elements classified under the cloud model are each managed by a unique NMS). When the first network element within the collective group is added to the routing topology, the inventory subsystem creates a new routing node table entry and a new NMS/EMS table entry. The NMS/EMS entry is initialized with a unique table identifier and the subnetwork identifier, as obtained from the inventory database. The routing table entry is initialized with a unique routing node identifier, the routing model type, and with the NMS/EMS table identifier of the corresponding NMS, thereby associating the routing node with a control entity. The inventory subsystem is able to determine that a cloud type routing node does not yet exist for the network element by first searching the NMS/EMS table for the NMS's subnetwork identifier. If no entry is found, the inventory subsystem determines that a routing node needs to be added to the routing topology. If an entry is found, the inventory subsystem determines that a routing node already exists for the element and no further entries are made.

A network element classified under the network element model is represented by a single routing node, even if the network element contains multiple chassis (here, any chassis information provided by the network configuration management system is ignored). Similar to the cloud model, the inventory subsystem begins by searching the NMS/EMS table for the subnetwork identifier of the network element's management system, as indicated by the inventory database. If the subnetwork identifier is not found in the table, a new entry is made for the management system, initializing the entry as above. If an entry is found, the table identifier is noted (recall that several network elements may be managed by the same EMS). Finally, a new entry is made in the routing node table for the network element and the entry is initialized with a unique routing node identifier, the network element identifier, the routing model type, and the table identifier for the NMS/EMS entry.

Network elements classified under the chassis restricted model are handled similar to elements classified under the network element model, with the exception that chassis related information is no longer ignored. As such, upon receiving a new network element classified under this model, the inventory subsystem first searches the NMS/EMS table for the subnetwork identifier of the corresponding management system, creating a new entry if the system is not found, and noting the table identifier if the system is found. Next, a new entry is made in the routing node table for each chassis within the network element, initializing each entry as above with the exception that the network element identifier for each entry inherently also identifies the corresponding chassis.

For network elements classified under the daisy-chain model, the chain is not complete and therefore not operational until the parent chassis is placed in the network because the child chassis do not have egress ports. However, a parent chassis alone is operational because it has both ingress and egress ports. As such, as chassis are inserted into the network and subsequently conveyed by the network configuration management system to the inventory subsystem, the inventory subsystem must determine if the chassis is a parent chassis because the routing topology cannot be updated to reflect the presence of a complete chain until the parent chassis is in place. The network configuration management system resolves this issue by updating the inventory database 222 to reflect the actual structure of the daisy-chain each time a chassis is entered into the database. In other words, each child chassis entry maintains information reflecting its relationship to the parent (i.e., which chassis are between it and the parent). Similarly, a parent chassis reflects either that it is a parent (i.e., there are no chassis between it and the parent) or that there is no chain (i.e., it is standalone).

As such, the network configuration management system conveys chassis specific information to the inventory subsystem for network elements classified under the daisy-chain model, in particular, each chassis' position in the chain. The inventory subsystem ignores the element if it is a child chassis. If the element is a parent, the inventory subsystem next searches the NMS/EMS table for the subnetwork identifier of the management system that manages the parent. If the subnetwork identifier is not found in the table, a new entry is made for the management entity. Next, a new entry is made in the routing node table for the parent chassis, initializing the entry as above with the network element also identifying the parent chassis.

Similar to adding equipment to the network, the routing topology needs to be updated to reflect the status of the network when equipment is removed from the network. As above, each time a network element is removed from the network, the network configuration management system updates the inventory database 222 and then calls the inventory subsystem to update the routing topology. Again, the network configuration management system provides the inventory subsystem with the product type, the manufacturer, and the network element identifier. As above, the inventory subsystem determines the equipment's routing model type, this determination being the basis on how to process the network element.

For network elements classified under the network element model, the chassis restricted model, or the daisy chain model, the inventory subsystem searches the routing node table for any entry that matches the network element identifier of the element to be removed (as above, the inventory subsystem ignores a chassis network element that is classified under the daisy-chain model and is a child in the chain). For network elements classified under the network element and daisy-chain models, there will be at most one routing node table entry. For network elements under the chassis restricted model, there may be multiple routing node entries, one for each chassis within the network element. Once the routing nodes are removed, a determination needs to be made as to whether the routing node's corresponding management system, as specified in the NMS/EMS table, has remaining entries in the routing node table; if not, the NMS/EMS table entry also needs to be removed. As such, after a routing node is removed, the routing node table is searched for any entries that still use the same management system as the removed routing node. If no entries are found, the corresponding entry in the NMS/EMS table is also cleared.

For network elements classified under the cloud model, the inventory subsystem determines if the network element is the last element within the routing node. Because inventory database 222 reflects the current status of equipment in the network and all network elements within a cloud routing node are managed by the same unique management entity, the inventory subsystem makes this determination by searching the inventory database for any other network elements with the same management entity as the network element to be removed. If there are other entries, no action is taken. If there are no other entries, this network element is the last element in the routing node and the routing node table entry and the NMS/EMS table entry are cleared.

Finally, in addition to adding and removing network elements to the network, it is also possible that existing network elements will be updated by the addition or removal of individual chassis. The addition or removal of chassis is similar to the addition or removal of network elements as described above. In general, note that the addition or removal of a chassis to the network only affects the routing topology if the chassis is a parent chassis classified under the daisy-chain model or if the chassis is classified under the chassis restricted model.

Reference will now be made to the routing topology/ graph creation with respect to links and the routing link table. Each time a physical link is installed between two network elements (e.g., between two ATM switches) or a new virtual trunk is created that spans multiple elements (e.g., an ATM VPC connecting a DSLAM and a gateway router), the network configuration manager updates the inventory database to reflect the new connection and then calls the inventory subsystem to update the routing topology. In general, the network configuration manager provides the inventory subsystem with the type of link (i.e., physical link or virtual trunk), the link's total bandwidth capacity, a link weight (link weights can be used to represent varying information, such as bandwidth, and are used by some routing algorithms to determine a path), a unique link identifier, the physical ports of the network equipment the link interconnects (i.e., the network element identifier along with a slot and port identifier for each end of the link), and, in the case of a virtual trunk, the logical identifier of each end of the link (i.e., the VPI for each end of the link) and possibly the service provider to whom the trunk is dedicated. As described earlier, physical links and virtual trunks are both modeled as routing links that interconnect two routing nodes. Each routing link is maintained as an entry in the routing link table, the link entry specifying the two routing nodes it interconnects.

As such, when the inventory subsystem receives a request to add a new physical link or virtual trunk to the model, it first makes a determination as to the two routing nodes that correspond to the two network elements that contain the ingress and egress points for the new link or trunk. Using the network element identifiers provided by the configuration management system, the inventory subsystem first determines the routing model types for the two interconnected network elements, which types dictate how the specific routing nodes will be found. For a cloud type network element, the subnetwork identifier of the network element's management system (as determined from the inventory database) is used to search the NMS/EMS table to determine the NMS/EMS table identifier, which identifier is then used to search the routing node table for the corresponding routing node. For a network element classified under the daisy-chain model, it is possible that the specified network element (i.e., here a chassis) is a child in the chain. As such, the inventory subsystem first queries the inventory database and determines the network element identifier of the parent chassis, and using this information, then searches the routing node table for the corresponding routing node entry. For a network element classified under the network element model or chassis restricted model, the inventory subsystem searches the routing node table for the corresponding network element identifier. In all cases, the routing node identifiers are noted. Next, the inventory subsystem create a new routing link table entry and initializes this entry with the two routing node identifiers and the information provided by the network configuration management system (e.g., capacity, weight, etc.). Finally, if the link is a virtual trunk, the inventory subsystem invokes the service activation system, requesting the actual provisioning of the trunk. As further described below for the provisioning of virtual circuits, the service activation system invokes the routing engine, which uses the routing topology created by the inventory subsystem to determine a routing path for the new virtual trunk based on the information originally provided by the network configuration management system. The determined routing path is a set of routing nodes and routing links. Based on this information, the service activation system then invokes the element adapter to provision the new trunk. Again, the provisioning process is described below.

Similar to the network elements, the inventory subsystem also updates the routing topology when physical links are removed or virtual trunks are de-provisioned. Based on a circuit number provided by the network configuration manager, the inventory subsystem searches the routing link table for the routing link and clears the entry. If the link is a virtual trunk, the inventory subsystem also invokes the service activation system to de-provision the link through the use of the element adapter.

In accordance with an aspect of our invention, a routing path is determined and configured using the routing topology/graph established by the inventory subsystem. As mentioned, this methodology is invoked by the inventory subsystem when a new virtual trunk is added to the network. As more particularly described here, this methodology is also invoked by the network configuration management system when a new virtual circuit needs to be provisioned. The service activation system 210 oversees routing path determination and configuration, whether invoked by the inventory subsystem or the network configuration management system. In either case, the service activation system is provided with the physical starting and ending points of the connection (i.e., the network element identifier along with a slot and port identifier) and whether new connection is for a virtual trunk or a virtual circuit. The service activation system must also determine which virtual identifiers to use (e.g., the VPI and VCI for an ATM circuit, the DLCI for a frame relay circuit). It may be provided these values by the network configuration management system, it may determine these values on its own, or it may query the NMSs, EMS, etc. to determine available values. The service activation system may also be provided with path related preference information for the new connection, such as the maximum weight for the path, minimum bandwidth, whether the path should comprise priorly established virtual trunks, whether the path should exclusively comprise priorly established virtual trunks, whether the path should comprise priorly established virtual trunks built for a specific service provider, etc.

Having this information, the service activation system first determines the two routing nodes corresponding to the specified start and end ports. This determination is made using the same procedure as described above for determining the two routing nodes interconnected by a link. Having the two routing nodes, the service activation system then invoke the routing engine 208 to determine a path between these two nodes. As indicated, together, the routing node table and routing link table provide a graph of the network. In general, a given routing node can be used to index the routing link table to determine the links that emanate from that node, and in turn, determined links can be used to index the routing node table to determine routing nodes that interconnect to the links. Having this graph and the starting and ending routing node, the routing engine determines a path, which determination can be made using any available routing algorithm (e.g., the Dijkstra Algorithm can be used to determine a shortest path based on path weights); however, no one routing algorithm is specific to our invention. Note however, that in addition to determining a path between two routing nodes, the routing engine can also take into account the provided preference information and the available bandwidth of a link to determine if a potential link should or should not be considered when determining a path.

In one specific embodiment of our invention, the routing engine will determine multiple paths between the two routing nodes. Specifically, the routing engine may determine a shortest path and one or more alternate shortest paths (i.e., a second, third, etc. alternate shortest path), using for example, the Dijkstra Algorithm. In addition, the routing engine may also note whether multiple links interconnect two routing nodes for each determined shortest path. The former determination can be performed by first determining a shortest path to the destination node and by then determining alternate shortest paths by determining a shortest path to each of the destination node's neighboring routing nodes. The latter determination can be performed by noting the multiple routing links between two routing nodes while iterating through the routing algorithm to determine a shortest path. The multiple path determination provides two functions: first, if the actual provisioning of a path fails, an alternate path can be used; second, the alternate paths can be used for load balancing. With respect to load balancing, we apply a two step process. First, if multiple links between two routing nodes have been determined, the routing engine chooses the link with the largest available bandwidth (this step is performed for the shortest path and the alternate paths). In the second step, the routing engine determines for each routing path, the link in that route with the minimum available bandwidth. The routing engine then selects as the chosen path the route whose corresponding determined link has the largest available bandwidth.

The result of the route determination performed by the routing engine is a set of routing nodes and routing links. From this information, the service activation subsystem uses the routing node and routing link tables to determine a cross-connection for each routing node (i.e., the network element identifier, the slot and port identifier, and the VPI/VCI, or DLCI). With this information, the service activation subsystem invokes one or more element adapters 212 (1 . . . n) to provision the virtual circuit or trunk.

As indicated above, the element adapter 212 interfaces the routing manager to the managed broadband network 110 by interfacing the routing manager to the NMSs, EMSs, and network elements. Again, there is a specific adapter for each type of NMS, EMS, and network element that requires management. Using the routing node table, the service activation system indexes the NMS/EMS table and determines the specific management system that services each routing node in the path. Based on this information, the service activation system invokes the appropriate element adapters 212 (1 . . . n) and provides that adapters with the specific management system and the required cross-connections. In turn, each adapter communicates with its corresponding management system and instructs each system to perform the necessary cross-connection (again, in the case of cloud based routing node, the NMS may need to perform additional route determination among the network elements). Ultimately, each management system reports back to its adapter as to whether the configuration was successful. In turn, each adapter reports back to the service activation system.

In one specific embodiment of our invention, the status of each cross-connection provisioned for a determined path is maintained in a cross-connection status database 224. This status includes whether the cross-connection has been successfully provisioned, which information is determined by an adapter as it provisions the cross-connection. Specifically, if a requested circuit/trunk is not successfully provisioned because one or more cross-connections failed, the circuit/trunk is not automatically taken down. Rather, the status of the cross-connections are maintained in database 224 (note, for example, that either service activation subsystem or element adapter can maintain the database). If a request is later made to reprovision the circuit/trunk, the service activation subsystem notes the cross-connections that have already been provisioned and only requests the adapters to configure the remaining cross-connections. Note also, that the circuit/trunk states are used to remove a configured cross-connection if necessary.

It should be further noted that our methods and systems for determining and provisioning paths through our inventive modeling methods are also applicable to layer 1 provisioning (e.g., Asynchronous, SONET/SDH, and DWDM). Here, the layer 1 carriers would be modeled as routing links and the network elements, such as add-drop multiplexers, terminal multiplexers, and digital cross-connect systems, would be modeled as routing nodes.

The above-described embodiments of our invention are intended to be illustrative only. Numerous other embodiments may be devised by those skilled in the art without departing from the spirit and scope of our invention.

We claim:

1. A provisioning system for establishing a path within a network, said network being comprised of network links and network elements, said system comprising:
   an inventory subsystem for modeling the network as a graph of nodes and links that interconnect the nodes;
   a routing engine that uses the graph for determining the path between points in the network; and
   a service activation system for invoking the routing engine to determine the path between the network points and for determining from the determined path and the network model a set of network element cross-connections to establish a virtual connection over said path;
   wherein the links of said graph represent network links, wherein each node of said graph represents a partial network element, a single network element, or a group of network elements, wherein each partial network element, a single network element, or group of network elements represented by a given node has edge ports, and wherein any combination of edge ports that are associated with a given node and that are capable of being interconnected can be interconnected.

2. The system of claim 1 wherein the virtual connection is a virtual trunk and wherein the inventory subsystem further models the virtual trunk as a link of the graph.

3. The system of claim 1 further comprising an element adapter for translating the set of cross-connections determined by the service activation system to commands for establishing the virtual connection within the network.

4. The system of claim 1 further comprising a database for maintaining a status for each of the individual cross-connections of the virtual connection, and wherein the service activation subsystem determines from the database which individual cross-connections, needed in order to reestablish the virtual connection, have already been established.

5. A provisioning system for establishing a path within a network, said network being comprised of network links and network elements, said system comprising:
   an inventory subsystem for modeling the network as a graph of nodes and links that interconnect the nodes;
   a routing engine that uses the graph for determining the path between points in the network; and
   a service activation system for invoking the routing engine, wherein the path determined by the routing engine is an initial path, wherein the routing engine additionally determines one or more secondary paths upon being invoked by the service activation system, wherein the service activation system chooses from among the initial and secondary paths a preferred path, and wherein the service activation system determines a set of network element cross-connections to establish a virtual connection over said preferred path;
   wherein the links of said graph represent network links, wherein each node of said graph represents a partial network element, a single network element, or a group of network elements, wherein each partial network element, single network element, or group of network elements represented by a given node has edge ports, and wherein any combination of edge ports that are associated with a given node and that are capable of being interconnected can be interconnected.

6. The system of claim 5 wherein if the preferred path cannot be established, the service activation system chooses from among the initial path and the one or more secondary paths another path to establish the virtual connection.

7. The system of claim 5 wherein the service activation system considers bandwidth of the initial and secondary paths when choosing the preferred path.

8. The system of claim 5 wherein the initial path between points in the network is between a source node and a destination node, and wherein the one or more secondary paths are determined by determining paths from the source node to the destination node's neighboring nodes.

9. A method for creating a graph of a network used for network routing, said network comprising network elements and network links, said method comprising the steps of:
   determining a routing model associated with the network element, wherein the routing model indicates how ports of the network element can be interconnected among themselves and other network elements;
   based on the determined routing model, determining for the network element whether the element should be associated with a plurality of network elements and represented collectively as a routing node, wherein routing nodes represent a partial network element or one or more network elements and have the characteristic that any edge ports of the represented partial network element or one or more network elements that are capable of being interconnected can be interconnected;
   if the network element should be associated with a plurality of network elements, determining if a routing node has been created for the plurality of network elements, and if no routing node has been created, determining, based on the network element and its corresponding routing model, if a routing node should be created;
   if the network element should not be associated with a plurality of network elements, determining, based on the network element's routing model, whether the network element should be represented as one routing node or a plurality of routing nodes, and creating the one or the plurality of routing nodes;
   representing each network link as a routing link, wherein a routing link interconnects routing nodes; and
   associating each routing link with two routing nodes, thereby creating the graph of the network, wherein the two associated routing nodes represent the two network elements interconnected by the network link represented by the muting link.

10. The method of claim 9, wherein the network further comprises one or mare virtual trunks, said method further comprising the steps of:
    representing each virtual trunk as a routing link; and
    associating each muting link representing a virtual trunk with two routing nodes.

11. A method for determining a path between points within a network, said network comprising a plurality of elements and a plurality of network links, said method comprising the steps of:
    modeling the plurality of elements as one or more routing nodes wherein each routing node represents a partial element, a single element, or a set of elements, wherein each partial element, single element, or a set of elements represented by a given routing node has edge ports, and wherein any combination of edge ports that are associated with a given routing node and that are capable of being interconnected can be interconnected;
    modeling each physical link as a routing link, wherein routing links interconnect routing nodes; and
    determining the path by determining a set of routing nodes and routing links that interconnect the points.

12. The method of claim 11 wherein the network further comprises one or more virtual connections, said method further comprising the step of modeling each virtual connection as a routing link.

13. The method of claim 11 wherein said partial elements, single element, or set of elements represented by a given routing node is managed by a common management entity.

14. The method of claim 11 wherein the element modeling step models an element comprising a plurality of interconnected chassis as one routing node.

15. The method of claim 11 wherein the element modeling step models a set of elements interconnected in a daisy chain as one routing node.

16. The method of claim 11 wherein the element modeling step models an element comprising a plurality of independent chassis as a plurality of routing nodes, each routing node corresponding to a chassis.

17. The method of claim 11 further comprising the step of determining from the determined set of routing nodes and routing links a set of network element cross-connections to provision a virtual connection over said path.

18. The method of claim 17 wherein the provisioned virtual connection is a virtual trunk, said method further comprising the step of modeling the provisioned virtual trunk as a routing link.

19. The method of claim 11, when,in the determined path is an initial path, said method further comprising the steps of:
determining one or more secondary paths; and
choosing from among the initial and secondary paths a preferred path.

20. The method of claim 19 wherein bandwidth is considered when choosing the preferred path.

21. The method of claim 19 wherein the initial path between points in the network is between a source muting node and a destination routing node, and wherein the one or more secondary paths are determined by determining paths from the source node to the destination node's neighboring nodes.

22. A method for determining a path between points within a network, said network comprising a plurality of elements and a plurality of network links, said method comprising the steps of:
modeling the plurality of elements as one or more routing nodes wherein each routing node represents a partial element, a single element, or a set of elements, wherein each partial element, single element, or a set of elements represented by a given routing node has edge ports, and wherein any combination of edge ports that are associated with a given routing node and that are capable of being interconnected can be interconnected;
modeling each physical link as a routing link, wherein routing links interconnect routing nodes;
determining the path by determining a set of routing nodes and routing links that interconnect the points;
determining from the determined set of routing nodes and routing links a set of network element cross-connections to provision a virtual connection over said path;
provisioning the cross-connections of the virtual connection;
maintaining the status of each cross-connection, said status indicating whether the cross-connection was successfully or unsuccessfully provisioned; and
if the virtual connection is not successfully provisioned because one or more cross-connections failed, attempting to provision the failed cross-connections in order to re-provision the virtual connection.

23. A provisioning system for establishing a path within a network, said network being comprised of network links and network elements, said system comprising:
an inventory subsystem for modeling the network as a graph of nodes and links that interconnect the nodes; and
a routing engine that uses the graph for determining the path between points in the network;
wherein the links of said graph represent network links, wherein each node of said graph represents a partial network element, a single network element, or a group of network elements, wherein each partial network element, single network element, or group of network elements represented by a given node has edge ports, and wherein any combination of edge ports that are associated with a given node and that are capable of being interconnected can be interconnected.

24. The system of claim 23 wherein the network further comprises virtual connections and wherein the links of the graph further represent said virtual connections.

25. The system of claim 23 wherein said partial network element, single network element, or group of network elements represented by a given node is managed by a common management entity.

26. The system of claim 23 wherein a network element comprising a plurality of interconnected chassis is represented as one node.

27. The system of claim 23 wherein a set of network elements interconnected in a daisy chain is represented as one node.

28. The system of claim 23 wherein a network element comprising a plurality of independent chassis is represented as a plurality of nodes, each node corresponding to a chassis.

* * * * *